US012621355B1

(12) United States Patent
Ding et al.

(10) Patent No.: US 12,621,355 B1
(45) Date of Patent: May 5, 2026

(54) NAVIGATION OF DIGITAL CONTENT DURING COLLABORATIVE CONSUMPTION

(71) Applicant: Meta Platforms, Inc., Menlo Park, CA (US)

(72) Inventors: Yifei Ding, Danville, CA (US); Derick Joseph Zhang, Lake Elsinore (CA)

(73) Assignee: Meta Platforms, Inc., Menlo Park, CA (US)

( * ) Notice: Subject to any disclaimer, the term of this patent is extended or adjusted under 35 U.S.C. 154(b) by 209 days.

(21) Appl. No.: 18/083,114

(22) Filed: Dec. 16, 2022

(51) Int. Cl.
*H04L 65/1089* (2022.01)
*G06F 3/0485* (2022.01)
*G06F 3/0488* (2022.01)
*H04L 65/613* (2022.01)

(52) U.S. Cl.
CPC ........ *H04L 65/1089* (2013.01); *G06F 3/0485* (2013.01); *G06F 3/0488* (2013.01); *H04L 65/613* (2022.05)

(58) Field of Classification Search
None
See application file for complete search history.

(56) References Cited

U.S. PATENT DOCUMENTS

| | | | | |
|---|---|---|---|---|
| 11,743,548 B1 * | 8/2023 | Gupta | ............. | H04N 21/43615 |
| | | | | 725/59 |
| 2015/0169069 A1 * | 6/2015 | Lo | ......... | H04L 65/403 |
| | | | | 715/753 |
| 2015/0355709 A1 * | 12/2015 | Lee | ........ | G06F 3/0346 |
| | | | | 345/156 |
| 2020/0225844 A1 * | 7/2020 | Lerner | ................. | G06F 3/0482 |
| 2022/0365606 A1 * | 11/2022 | Hinckley | ............. | G06F 3/0482 |
| 2022/0368685 A1 * | 11/2022 | Pollack | .................... | H04L 9/16 |
| 2022/0377177 A1 * | 11/2022 | Tadge | ................... | H04N 7/152 |
| 2023/0196836 A1 * | 6/2023 | Malpani | .............. | G06V 40/172 |
| | | | | 382/103 |
| 2024/0039971 A1 * | 2/2024 | Mayfield | .............. | H04L 65/403 |

* cited by examiner

*Primary Examiner* — Duc Nguyen
*Assistant Examiner* — Assad Mohammed
(74) *Attorney, Agent, or Firm* — EVERSHEDS SUTHERLAND (US) LLP

(57) ABSTRACT

Systems, methods, and non-transitory computer readable media are configured to perform operations comprising providing, by a computing system, a currently playing content item in an interface presented through a screen to a group for collaborative online consumption; receiving, by the computing system, a command in a selected direction from a user in the group to select a new content item for the group to consume; and in response to the command, causing, by the computing system, scrolling of the interface such that the currently playing content item disappears and the new content item appears through the screen.

19 Claims, 10 Drawing Sheets

500

Provide a currently playing content item in an interface presented through a screen to a group for collaborative online consumption
502

Receive a command in a selected direction from a user in the group to select a new content item for the group to consume
504

In response to the command, cause scrolling of the interface such that the currently playing content item disappears and the new content item appears through the screen
506

200

202

300

202

302

304

306

400

202

402

404

304

306

420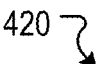
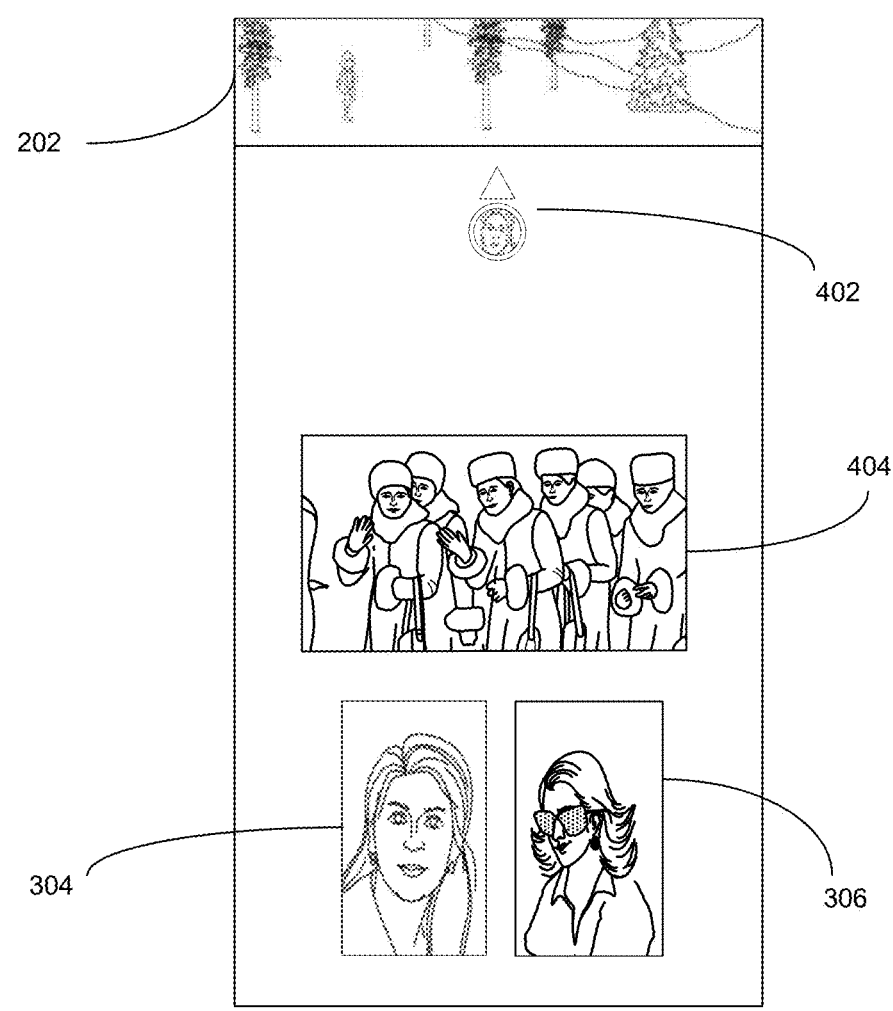
FIGURE 4B

440

404

442

460

202

404

442

500

Provide a currently playing content item in an interface presented through a screen to a group for collaborative online consumption
502

Receive a command in a selected direction from a user in the group to select a new content item for the group to consume
504

In response to the command, cause scrolling of the interface such that the currently playing content item disappears and the new content item appears through the screen
506

FIGURE 5

702 — Processor

704 — Cache

716 — Network Interface

710 — Host Bridge

706 — High Performance I/O Bus

712 — I/O Bus Bridge

714 — System Memory

708 — Standard I/O Bus

718 — Mass Storage

720 — I/O Ports

700

NAVIGATION OF DIGITAL CONTENT DURING COLLABORATIVE CONSUMPTION

FIELD OF THE INVENTION

The present technology relates to the field of digital content. More particularly, the present technology relates to collaborative online consumption of digital content.

BACKGROUND

People can utilize computing devices for a wide variety of purposes. For example, users can utilize computing devices to access a content sharing platform (e.g., social networking system) or a communications platform (e.g., messaging system). The users can utilize the computing devices to interact and communicate with one another in a variety of manners. For example, the computing devices can run applications associated with a selected platform to allow remote users to collaboratively consume online content together.

SUMMARY

Various embodiments of the present technology can include systems, methods, and non-transitory computer readable media configured to perform operations comprising providing, by a computing system, a currently playing content item in an interface presented through a screen to a group for collaborative online consumption; receiving, by the computing system, a command in a selected direction from a user in the group to select a new content item for the group to consume; and in response to the command, causing, by the computing system, scrolling of the interface such that the currently playing content item disappears and the new content item appears through the screen.

In some embodiments, the command is a swipe by the user applied to the screen through which the interface is presented.

In some embodiments, the selected direction is vertical and upward.

In some embodiments, during the swipe, the interface includes a notification that informs users in the group about the swipe.

In some embodiments, the notification includes an identification of the user who is performing the swipe.

In some embodiments, the notification includes an indication of the direction of the swipe.

In some embodiments, the notification disappears from the interface after conclusion of the swipe.

In some embodiments, at least partial appearance of a second new content item occurs in response to receipt of another command in the selected direction by any user of the group.

In some embodiments, a command by any user of the group in a direction opposite to the selected direction causes at least partial appearance of a previously accessed content item.

In some embodiments, the currently playing content item and the new content item are scrolled until the new content item is locked in full view and the currently playing content item is no longer viewable.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the present technology.

BRIEF DESCRIPTION OF THE DRAWINGS

FIG. 4B illustrates an example view of an interface, according to an embodiment of the present technology.

FIG. 5 illustrates an example method, according to an embodiment of the present technology.

Figure 1:
FIG. 1 illustrates an example system including a content navigation module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Today, people can utilize computing devices for a wide variety of purposes. For example, users can utilize computing devices to access a content sharing platform (e.g., social networking system) or a communications platform (e.g., messaging system). The users can utilize the computing devices to interact and communicate with one another in a variety of manners. For example, the computing devices can run applications associated with a selected platform to allow remote users to collaboratively consume online content together. The applications can allow remote users to connect in real time in an online session or other medium, such as a call. During the call, the users can engage in, for example, video communications. During the call, the users also can select content that they can consume together at the same time as a collaborative activity. The content can include, for example, various types of video content that the users can watch together.

In conventional techniques, the ability of users in a group to access desired content to consume together poses many disadvantages. For example, when the users have completed watching one video, another video, which was automatically selected, can begin to auto-play. The users may not be provided with functionality to select from among a variety of videos that may be of interest to them. Rather, the users may need to navigate to another screen, such as a browse screen, on which other videos are displayed for potential selection. Alternatively, the users may need to navigate to and utilize a search function to manually enter a desired topic or selection to access more content. Such burdensome effort required in conventional techniques to access content detracts from user experience. Further, because of the complexities in discovering suitable content in conventional techniques, a user may feel anxiety or uncertainty about successfully finding content that is appropriate for and desired by all persons in the group. Thus, conventional techniques can undermine the ability of users to more desirably focus on sharing reactions and engaging in conversations during co-watch experiences.

An improved approach rooted in computer technology overcomes the foregoing and other disadvantages associated with conventional approaches specifically arising in the realm of computer technology. In various embodiments, the present technology can allow a group of users to collaboratively consume content, such as watch videos together, in a real time, online session. An application ("app") running on computing devices of a group of users can allow the users to consume content together in real time and to seamlessly navigate to new content items as desired. An interface of the application presented through a screen of a computing device can indicate to a user that a gesture applied to the interface, such as a swipe, can allow the group to effortlessly advance from a currently playing content item to a new content item. The interface can indicate a direction that a user should swipe to access the new content item. During a swipe by the user, the interface can provide a transition animation through which the currently playing content item is scrolled out of view and the new content item is scrolled into view. As the transition animation concludes, the new content item can be fully displayed and "locked" into full display in the interface without display of the previously playing content item. During a swipe, the interface can provide an identification of the particular user who is swiping as well as the direction of the swiping. The users in the group are thereby informed that the particular user is swiping to access a new content item for the group. Additional swiping by any users in the group can cause additional new content items to appear for consumption by the group. The new content items presented through swiping in this manner can be selected and chained in succession based on a variety of content selection considerations. More details relating to the present technology are provided herein.

FIG. 1 illustrates an example system 100 including a content navigation module 102, according to an embodiment of the present technology. The content navigation module 102 can allow a group of users to collaboratively consume the same content in real time in a joint online session (e.g., watch videos together, read content together, etc.) and also to seamlessly navigate to new content to consume together as desired. As used herein, a group can include two or more users who may wish to collaboratively consume content and access new content to consume together in real time (or near real time). The users may be physically or geographically remote from another. An interface of an application running on computing devices of the users can provide functionality to allow the users to access new content to consume together. The interface can prompt any user in the group to provide a command or gesture, such as a swipe in a particular direction on a screen through which the interface is presented, to access new content. In response to the swipe, the interface in a frictionless manner can present to the group a new content item for consumption. Each additional swipe in the same direction by any user in the group can cause the interface to present an additional new content item for consumption by the group. When any user swipes in an opposite direction, the previously presented content item can reappear. As a user swipes, the interface can indicate to the users in the group the identity of the user who is swiping and the direction of the swiping. New content items presented to the group in response to swiping are selected based on various considerations to ensure consistency among chained content items successively provided to the group. Although some of the examples discussed herein relate to collaborative consumption of video, the present technology is applicable to other types of content besides video.

In some embodiments, the system 100, including the content navigation module 102, can be implemented on a server system that is in communication over a communications network with client computing devices 108a, 108b, 108c, 108d, 108e to implement the present technology. In some embodiments, the client computing devices 108 can include or be implemented with a user device 610, as discussed in relation to FIG. 6. In some embodiments, some or all of the functionality of the content navigation module 102 can be performed by a server of the system 100. In some embodiments, some or all of the functionality of the content navigation module 102 can be performed by an application running on the client computing devices 108. In some embodiments, the functionality of the content navigation module 102 can be distributed between a server of the system 100 and an application running on the client computing devices 108. The system 100 can be associated with a suitable platform or system. For example, the system 100 can be implemented by a content sharing platform or system, such as a social networking system, or a communication platform or system, such as a messaging system. Although a social networking system may be referenced in various examples discussed herein, the present technology also applies to any type of messaging platform or system, content sharing platform or system, or the like. In some instances, the system 100 can include at least one data store (not shown) in communication with the content navigation module 102. The data store can maintain information required to support operation of the system and the content navigation module 102. For example, the data store can maintain information about preferences of a user regarding content, common preferences of a group of users regarding content, and content already consumed by users. As another example, the data store can maintain a scoring or ranking of content items that are suitable for presentation to a group of users who are collaboratively consuming content.

The client computing devices 108a, 108b, 108c, 108d, 108e can be, for example, any combination of mobile devices and non-mobile devices, such as smart-phones, laptops, tablets, desktop computers, watches, etc. Each of the client computing devices 108a, 108b, 108c, 108d, 108e can include one or more applications running on the client computing device 108 and having functionality to support or perform the functionality of the present technology. The application on the client computing devices 108 of users can allow the users to simultaneously consume the same content in a joint online session, thus providing a shared experience that allows real time communication and interaction between or among the users in relation to the content being consumed. The application on the client computing devices 108 can include an interface that is presented through a screen of the client computing device 108. In some embodiments, a user of the client computing device 108 can interact with the application through appropriate inputs and commands (e.g., swipes) applied to the screen through which the interface of the application is presented. The application on the client computing devices 108 can allow any user of a group to easily navigate to new content items to be collaboratively consumed by the group. In addition, the interface can provide notifications to the group about selection of new content for the group as well as the user who initiated the selection.

Each of the client computing devices 108*a*, 108*b*, 108*c*, 108*d*, 108*e* can be associated with or controlled by a different user. Appropriate commands provided by users of the client computing devices 108*a*, 108*b*, 108*c*, 108*d*, 108*e* can cause smooth, burden-free navigation to new content items for consumption by the group. The content navigation module 102 can include a swiping module 104, a notification module 106, and a chaining module 108. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the content navigation module 102 can be implemented in any suitable combinations.

The swiping module 104 can provide functionality to allow a user of a computing device, such as the client computing device 108, to navigate to new content that can be consumed by a group of users together. For each computing device of each user in the group, the swiping module 104 can generate an interface of an application running on the computing device that displays content for collaborative consumption by the group of users. The interface can display to each user of the group a content item being played. Commands by any user of the group can be applied to a screen through which the interface is presented to navigate to new content. For example, a user command, such as a swipe in a first direction on the screen, by the user while a currently playing content item is displayed through the interface can provide the group with access to a new content item. Additional swipes in the first direction by one or more users of the group cause additional new content items to be presented to the group. A swipe in the first direction can involve the user maintaining depression of a finger on the screen as the finger is moved along the first direction. In some embodiments, the first direction can be a vertical, upward direction. When the user swipes in the first direction, the swiping module 104 can generate a transition animation to transition display of the currently playing content item to display of the new content item.

In some embodiments, the transition animation can reflect scrolling behavior such that the currently playing content item is continuously moved off screen and, at the same time, the new content item is continuously moved on screen. In some embodiments, the speed of the off screen movement of the currently playing content item and the on screen movement of the new content item can be proportional to, equal to, or otherwise based on the speed of the associated swipe. In some embodiments, the transition animation is presented through the interface displayed on the computing device of the user performing a swipe for new content but is not presented through interfaces displayed on the computing devices of the other users in the group. In some embodiments, a different type of transition animation can be generated for the other users. For example, the different type of transition animation can be associated with scrolling behavior in which the currently playing content item is moved off screen and the new content item is moved on screen at a selected speed independent of the swiping speed of the user who is seeking the new content item. In some embodiments, for the users who are not swiping, the movement of a new content item on screen and the simultaneous movement of a currently playing content item off screen can be animated as a quick flipping or flashing action.

In some embodiments, during the transition animation for the user who is swiping and the transition animation for the other users in the group, the currently playing content item can continue to play as the currently playing content item moves off screen while a frame of the new content item is displayed as the new content item moves on screen. In some embodiments, during the transition animation for the user who is swiping and the transition animation for the other users in the group, the currently playing content item can continue to play as the currently playing content item moves off screen while the new content item plays as the new content item moves on screen. In some embodiments, the transition animation can conclude when the user who is swiping removes their finger from the screen through which the interface is presented. Upon removal of the finger of the user, the transition animation can conclude by locking into position the currently playing content item so that it displays in its entirety without display of any portion of the new content item or by locking into position the new content item so that it displays in its entirety without display of any portion of the previously playing content item. Whether the currently playing content item or the new content item locks into position can depend on a movement property of a swipe by the user in comparison to a threshold value. For example, if a swipe length or speed of the user satisfies a swipe length or speed threshold, the new content item can lock into full view. As another example, if the swipe length or speed of the user does not satisfy the swipe length or speed threshold, the currently playing content item can lock into full view. Many variations are possible.

The interface generated by the swiping module 104 can also support selection by any user of previously accessed content. As discussed, each vertical swipe in a first direction, such as an upward direction, can provide the group with access to an additional new content item. In some embodiments, a vertical swipe in a second direction, such as a downward direction, can provide the group with access to the content item that was just previously accessible to the users in the group. For example, if a user swipes a first time in an upward direction, a first new content item can appear in the interface for display to the group. If the user then swipes a second time in an upward direction, a second new content item can appear in the interface for display to the group. In this example, if the user then swipes a third time in a downward direction, the first new content item can reappear in the interface for display to the group. Likewise, if the user then swipes a fourth time in the downward direction, a content item that was previously presented to the group just before presentation of the first new content item can reappear in the interface for display to the group. The swiping module 104 can generate transition animations for transitions from a currently playing content item to a previously displayed content item, as described above. For example, scrolling behavior for the transition animation can reflect off screen movement of the currently playing content item and on screen movement of the previously accessed content item. Many variations are possible.

The swiping module 104 can generate videos capturing real time actions and reactions of each user in the group during the collaborative session (e.g., video chiclets). The videos of the users can be presented at selected positions on the interface and do not move when the currently playing content item and the new content item scroll in the transition animation. In some embodiments, the video capturing each user in the group can be moved by a user to a desired location through, for example, a dragging gesture applied to a screen through which the video is presented. In some embodiments, videos capturing each user in the group during the collaborative session (e.g., video chiclet) can be embedded in the currently playing content item or the new content item and thus scroll as the new content item and the currently playing content item scroll in the transition animation.

The notification module 106 can provide notifications in the interface of the application running on the computing devices of users participating in a joint online session where content is collaboratively consumed. The notifications can be presented in the interface to provide transparency to all users in the group about actions taken by the users in relation to content consumption and content selection. In some embodiments, the notification module 106 can generate a notification in the interface that informs users that a particular command was provided by a user to access new content. For example, a notification can include text to explain to the users how to take action to bring new content to the group. In one implementation, the notification can include a message, such as "swipe for more" or a similar instruction, that specifies user action required to access new content.

In some embodiments, the notification module 106 can generate notifications in the interface to identify a user who is taking action to access new content or return to previously accessed content as well as to describe the action being taken. For example, when a user swipes in a particular direction, the notification module 106 can generate an identifier of the user who is swiping, such as a profile picture, and a directional indicator that describes the direction that the user is swiping. The identifier of the user who is swiping and the directional indicator can be presented in the interface. When presented through the interface, the identifier of the user and the directional indicator inform the users in the group that the identified user is accessing new content or returning to previous content for group consumption. In some embodiments, the identifier of the user and the directional indicator can remain displayed in the interface for as long as the identified user is swiping. After the swiping has concluded, the identifier of the user and the directional indicator can be removed from display. In some embodiments, the identifier of the user and the directional indicator are positioned adjacent to one another and appear at locations in the interface based on the location of a swipe. For example, when a user is swiping to transition to a different content item, the identifier of the user and the directional indicator can move together along a path that mirrors the path of the swiping finger of the user. Many other variations can be implemented.

The notification module 106 can provide other types of notifications in the interface that inform about different actions taken by users in a collaborative, online session for consuming content together. For example, a notification can be presented in the interface that indicates that a user is pausing or resuming play of a content item for the group and that identifies the user. As another example, a notification can be presented in the interface that indicates that a user is fast forwarding or rewinding a content item being played for the group and that identifies the user. As yet another example, a notification can be presented in the interface that indicates that a user is jumping (or scrubbing) to a certain location in a content item during consumption by the group and that identifies the user. Many different notifications are possible.

The chaining module 108 can select and determine new content items to present to a group of users collaboratively consuming content. In some embodiments, new content items can be selected based on interests of the particular user who is swiping on the interface to access more content items. For example, the interests of the user can be determined from entities on a social networking system or platform or a communications system or platform that are being followed by the user. The entities can include, for example, pages, individuals, celebrities, groups, etc. The entities can be associated with certain topics or themes. The interests of the user can be based on the topics or themes of the entities followed by the user. The interests of the user can be used to identify new content items that are associated with the interests. In some embodiments, new content items can be selected based on mutual interests of users in a group who are collaboratively consuming content. For example, the interests of each user in the group can be determined. Interests that are common to a portion or an entirety of the users in the group can be determined from the topics and themes associated with the entities followed by the users. The common interests can be used to identify new content items that are associated with the common interests. Newly identified content items can be scored based on their relevance to the interests of a user or common interests of a group of users. The newly identified content items can be ordered or ranked based on their scores.

The chaining module 108 can cause ordered, newly identified content items to be made accessible to a group of users who are collaboratively consuming content. A first swipe by a user for new content can result in presentation of a newly identified content item with the highest score. Each subsequent swipe of a user for new content can result in presentation of another newly identified content item with the next highest score. In some embodiments, each newly identified content item to be shown to a group of users can be from an ordered collection of newly identified content items that were selected based on the interests of a user who is swiping for more content items. In some embodiments, each newly identified content item to be shown to a group of users can be from an ordered collection of newly identified content items that were selected based on the common interests of the group of users. In some embodiments, each newly identified content item to be shown to a group can be from a combination of an ordered collection of newly identified content items that were selected based on the interests of a user who is swiping for more content items and an ordered collection of newly identified content items that were selected based on the common interests of the group. Many variations are possible.

The chaining module 108 can account for various considerations that impact which content items are presented to a group in response to a swipe for more content. In some embodiments, a user of a group may have blocked an entity, such as another person. When an entity has been blocked by a user in a group, no content associated with the entity is presented to the group in response to swiping for more content by any user in the group. Thus, for the group of users, no content associated with entities blocked by any of the users of the group is presented to the group. Likewise, in some embodiments, a user of a group may have blocked access to a certain topic. As an integrity filter, no content associated with the topic is presented to the group in response to swiping for more content by any user in the group. Thus, for the group of users, no content associated with any topics blocked by any of users of the group are presented to the group. In some embodiments, privacy related considerations are reflected in the selection of new content items presented to a group. For example, as mentioned, each newly identified content item to be shown to a group of users can be from a combination of an ordered collection of newly identified content items that were selected based on the interests of a user who is swiping for more content items and an ordered collection of newly identified content items that were selected based on the common interests of the group. In some instances, a percentage (or ratio) of newly identified content items selected based on the common interests of the group that are shown to the group in response to swiping for new content does not exceed a threshold percentage value. This constraint can be implemented to further privacy protections of users in the group, especially when the number of users in the group is relatively few.

Further, the chaining module 108 can select new content items for successive presentation to the group that are consistent with one another. In some embodiments, the level or extent of difference between consecutive new content items to be presented to the group is less than a threshold level value. For example, successive new content items can be selected to reflect topics that are similar to a threshold degree. As another example, successive new content items can be selected to have playback durations that are similar to a threshold degree. In some embodiments, successive content items can be selected to have similar or the same format. For example, content items that have different content formats or different user interfaces may not be chained together for presentation to the group. In one instance, if a first new content item is a shorter form video (e.g., Reel) and a second new content item is a longer form video (e.g., a movie), the first new content item and the second new content item are not chained together. In another instance, if a first new content item is associated with options to react to the content item (e.g., likes, comments, share, etc.) at one location in an interface that displays the first new content item and a second new content item is not associated with options to react to the second new content item or has the options at another location in an interface that displays the second new content item, the first new content item and the second new content item are not chained together for successive presentation to the group. In yet other instances, a first new content item associated with a first aspect ratio and a second new content item associated with a second aspect ratio can be chained together in some implementations and not chained together in other implementations. Many variations based on different chaining considerations are possible.

FIGS. 2-4C illustrate example views of an interface of an application that can be presented through a screen of a computing device of a user in a group that is collaboratively consuming content in real time in a joint online session, according to an embodiment of the present technology. In some embodiments, the views of the interface can be generated by the content navigation module 102 and the capabilities of the interface can reflect the described functionality of the content navigation module 102. As mentioned, the functionality of the content navigation module 102 can be implemented in whole or in part on a server system or on an application running on a computing device of a user in the group.

Figure 2:
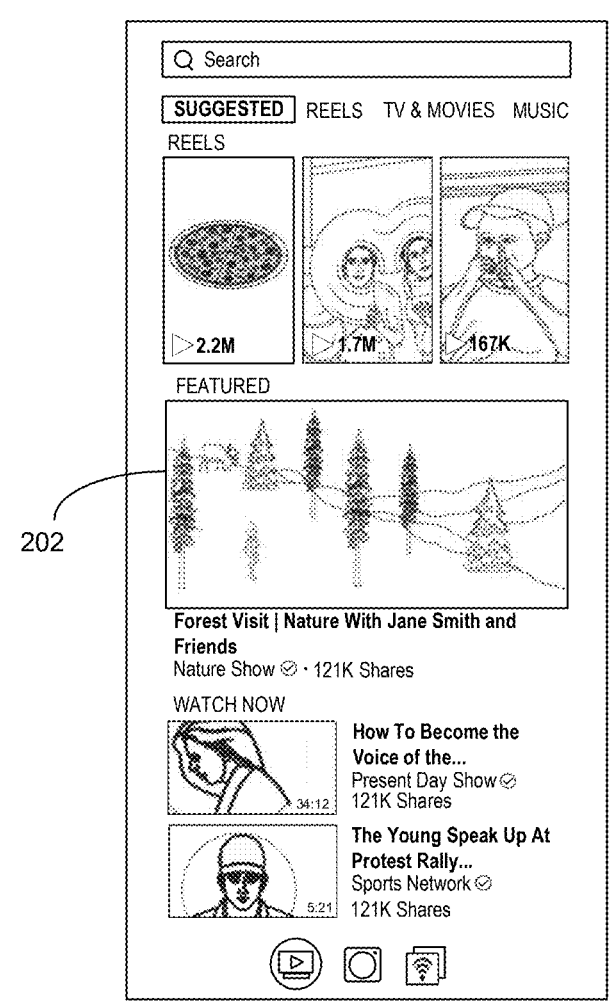
FIG. 2 illustrates an example view of an interface, according to an embodiment of the present technology.

In FIG. 2, a view 200 of an interface of an application is presented to a user of the group. The interface 200 can be a surface (e.g., browse surface) from which a group of users that wishes to collaboratively consume content in a joint online session can select content to consume together. The view 200 can include different categories of content to consume, such as suggested content, short form (duration) content (e.g., Reels), TV & movies, and music. Other types of content are possible. As shown, the view 200 includes a variety of suggested content items that have been selected for the user of the group who is presented with the view 200. In one example, the user can select a content item 202 that the group can watch together.

Figure 3:
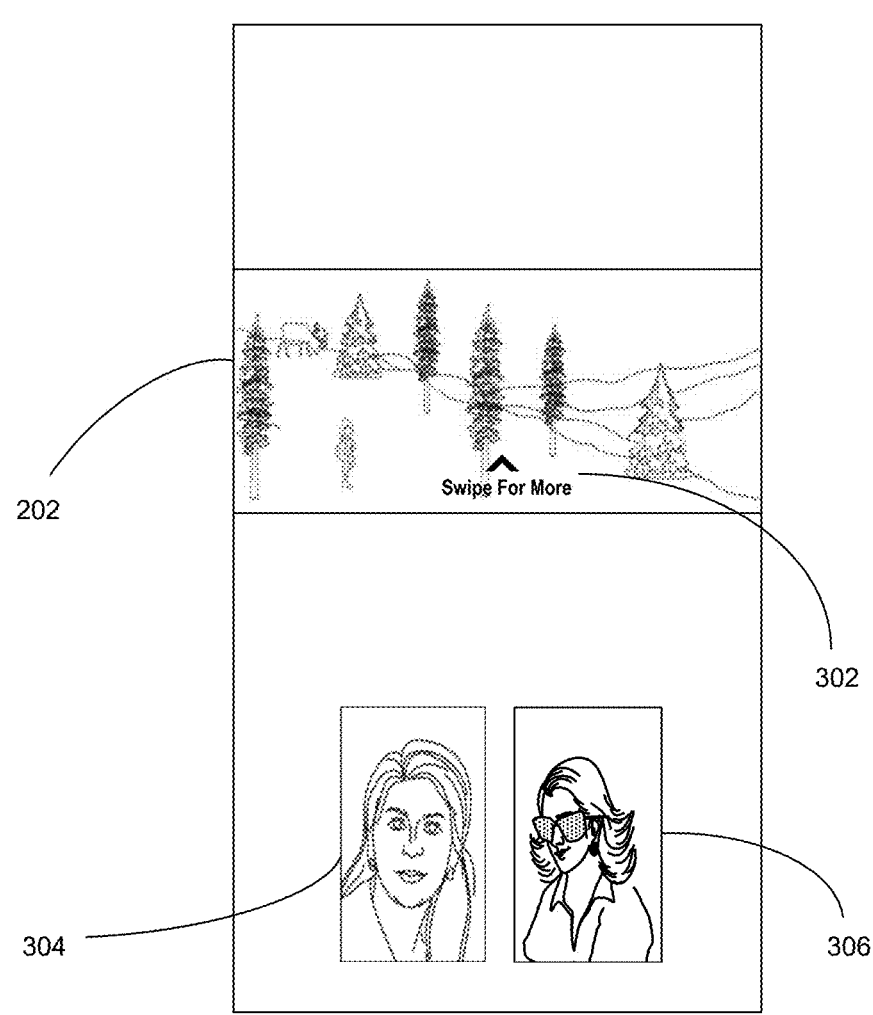
FIG. 3 illustrates an example view of an interface, according to an embodiment of the present technology.

In FIG. 3, a view 300 of the interface shows the content item 202 being played in the interface for the users in the group. The view 300 includes a notification 302. The notification 302 can include an indication (e.g., "Swipe for More") to the user about what action to take to access new content in real time for the group. In the example shown, the indication can inform the user that a swipe of a finger on the screen through which the interface is presented can provide access to new content. The notification 302 also can include an indication of the direction of the action that should be taken to access the new content. In the example shown, an arrow in the notification 302 indicates that the user should vertically swipe in an upward direction to access new content items. The interface also can include real time videos of the users in the group as they are collaboratively consuming the currently playing content item 202. In the example shown, the interface includes a video of a first user (chiclet) 304 and a video of a second user (chiclet) 306, who together constitute the group. In other examples, any number of users (e.g., five users, 50 users, etc.) can be included in a group for collaboratively consuming content together.

Figure 4A:
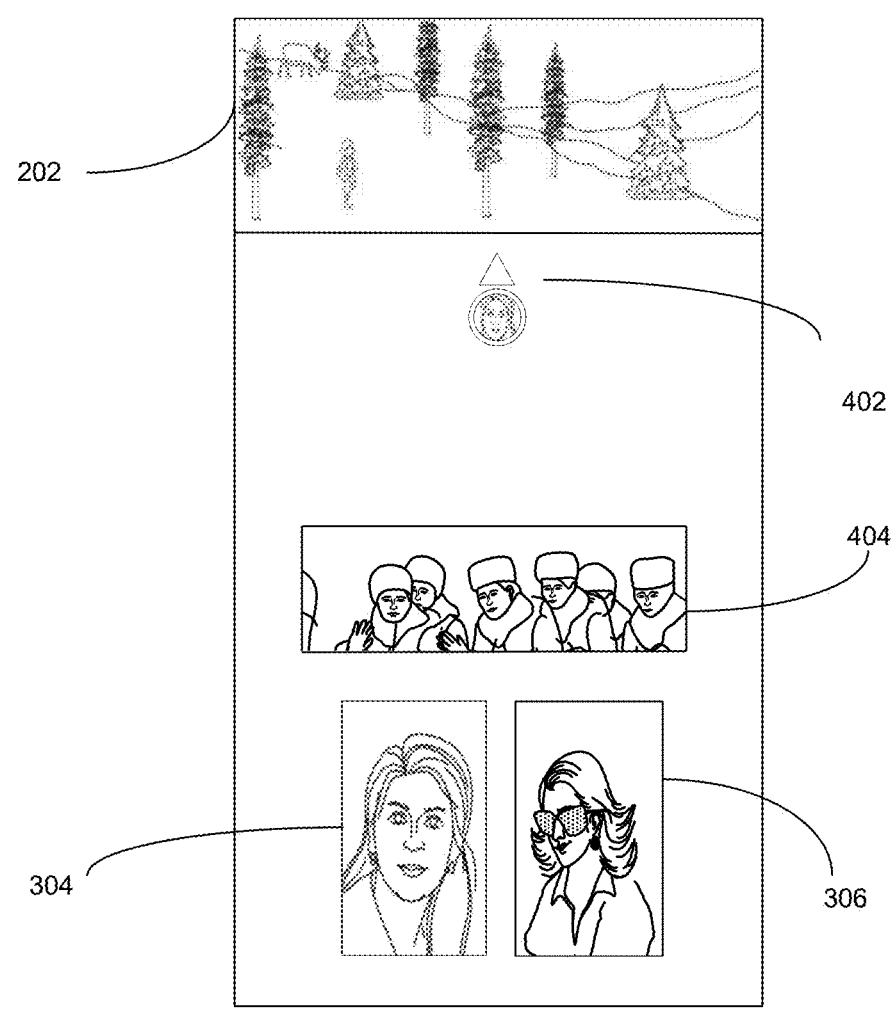
FIG. 4A illustrates an example view of an interface, according to an embodiment of the present technology.

In FIG. 4A, a view 400 of the interface reflects swiping by the first user. The interface includes a notification 402 to all users in the group that the first user is swiping to access a new content item. The notification 402 can include an identification of the first user. As shown in this example, the identification of the first user is an image (e.g., profile picture) of the first user. The notification 402 also can include an indication of the direction of the swiping by the first user. As shown, the direction of the swiping by the first user is in a vertical, upward direction to access new content. Swiping by the first user in this manner causes the interface to scroll so that the currently playing content item 202 moves off screen. At the same time, swiping by the first user in this manner causes the interface to scroll so that a new content item 404 moves on screen. In some embodiments, the interface viewed by the first user may scroll as part of a transition animation at the speed of the swipe by the first user. In the transition animation, the currently playing content item 202 can continuously move off screen and the new content item 404 can continuously move on screen. In some embodiments, after the swipe, the interface viewed by the second user instead may simply flip or flash to ultimately present only the new content item 404 in full view. As shown, scrolling of the currently playing content item and the new content item does not cause the video of the first user 304 and the video of the second user 306 to scroll or otherwise move. In other examples (not shown), the video of the first user 304 and the video of the second user 306 can be embedded in a content item and move with the content item as the content item scrolls. In FIG. 4B, a view 420 of the interface illustrates further progress in the swipe by the first user. As shown, less of the currently playing content item 202 is displayed in the interface and more of the new content item 404 is displayed in the interface.

Figure 4C:
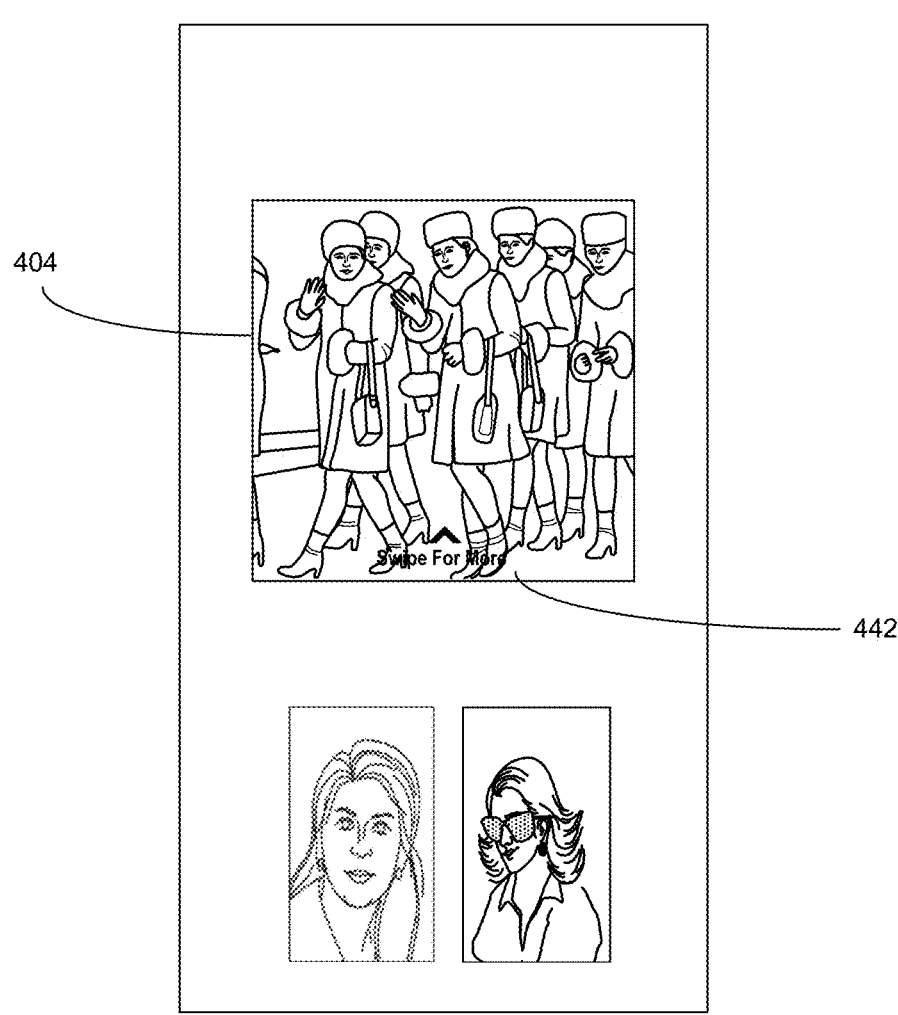
FIG. 4C illustrates an example view of an interface, according to an embodiment of the present technology.

In FIG. 4C, a view 440 of the interface shows that the new content item 404 has locked into full view. The previously playing content item 202 is no longer visible in the interface. The new content item 404 can continue playing for the first user and the second user, as desired. The view 440 includes a notification 442. The notification 442 can include an indication (e.g., "Swipe for More") to users in the group about what action to take to access more content items in real time for the group.

Figure 4D:
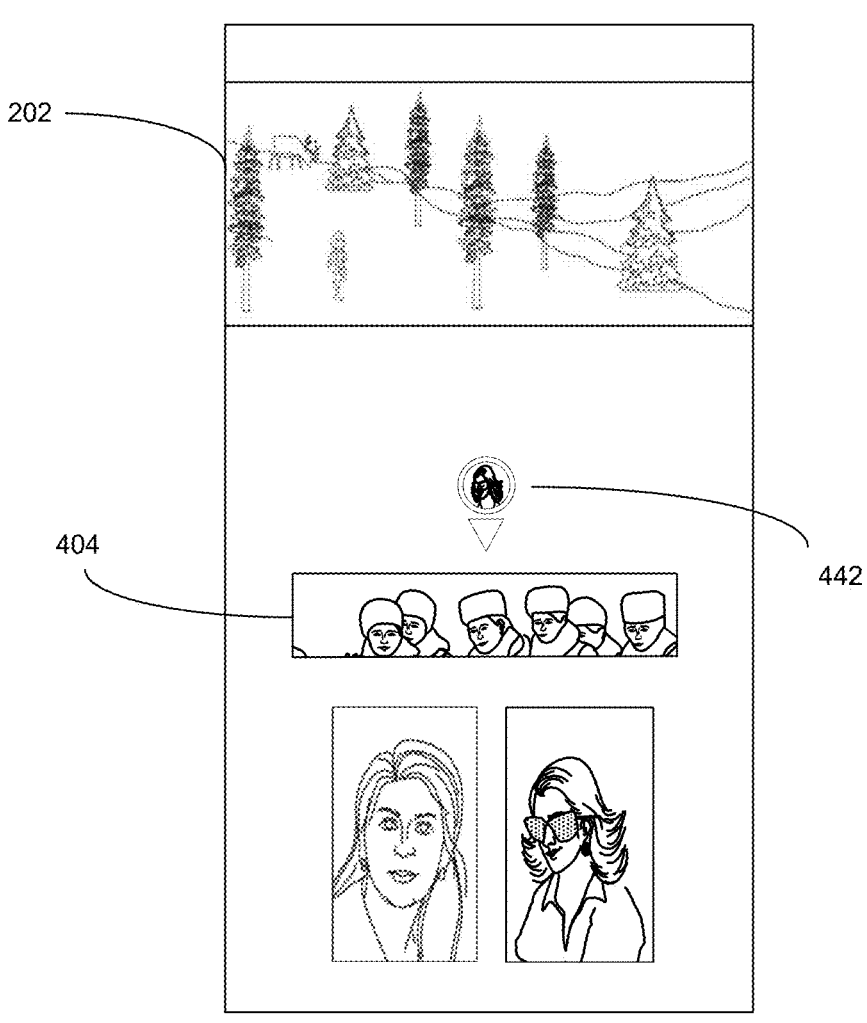
FIG. 4D illustrates an example view of an interface, according to an embodiment of the present technology.

In FIG. 4D, a view 460 of the interface reflects swiping by the second user in a vertical, downward direction. The view 460 includes a notification 442 to all users in the group that the second user is swiping to access a previously viewed content item, the content item 202. The notification 442 can include an identification of the second user. The notification 442 also can include an indication of the direction of the swiping by the second user. As shown, the direction of the swiping by the second user is in a vertical, downward direction to access content that was previously viewed by the group. Swiping by the second user in this manner causes the interface to scroll so that the previously accessed content item 202 moves on screen. At the same time, swiping by the second user causes the interface to scroll so that the new content item 404 moves off screen.

FIG. 5 illustrates an example method 500, according to an embodiment of the present technology. It should be understood that there can be additional, fewer, or alternative steps performed in similar or alternative orders, or in parallel, based on the various features and embodiments discussed herein unless otherwise stated. At block 502, the method 500 can provide a currently playing content item in an interface presented through a screen to a group for collaborative online consumption. At block 504, the method 500 can receive a command in a selected direction from a user in the group to select a new content item for the group to consume. At block 506, the method 500 can, in response to the command, cause scrolling of the interface such that the currently playing content item disappears and the new content item appears through the screen.

It is contemplated that there can be many other uses, applications, and/or variations associated with the various embodiments of the present technology. For example, in some cases, a user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
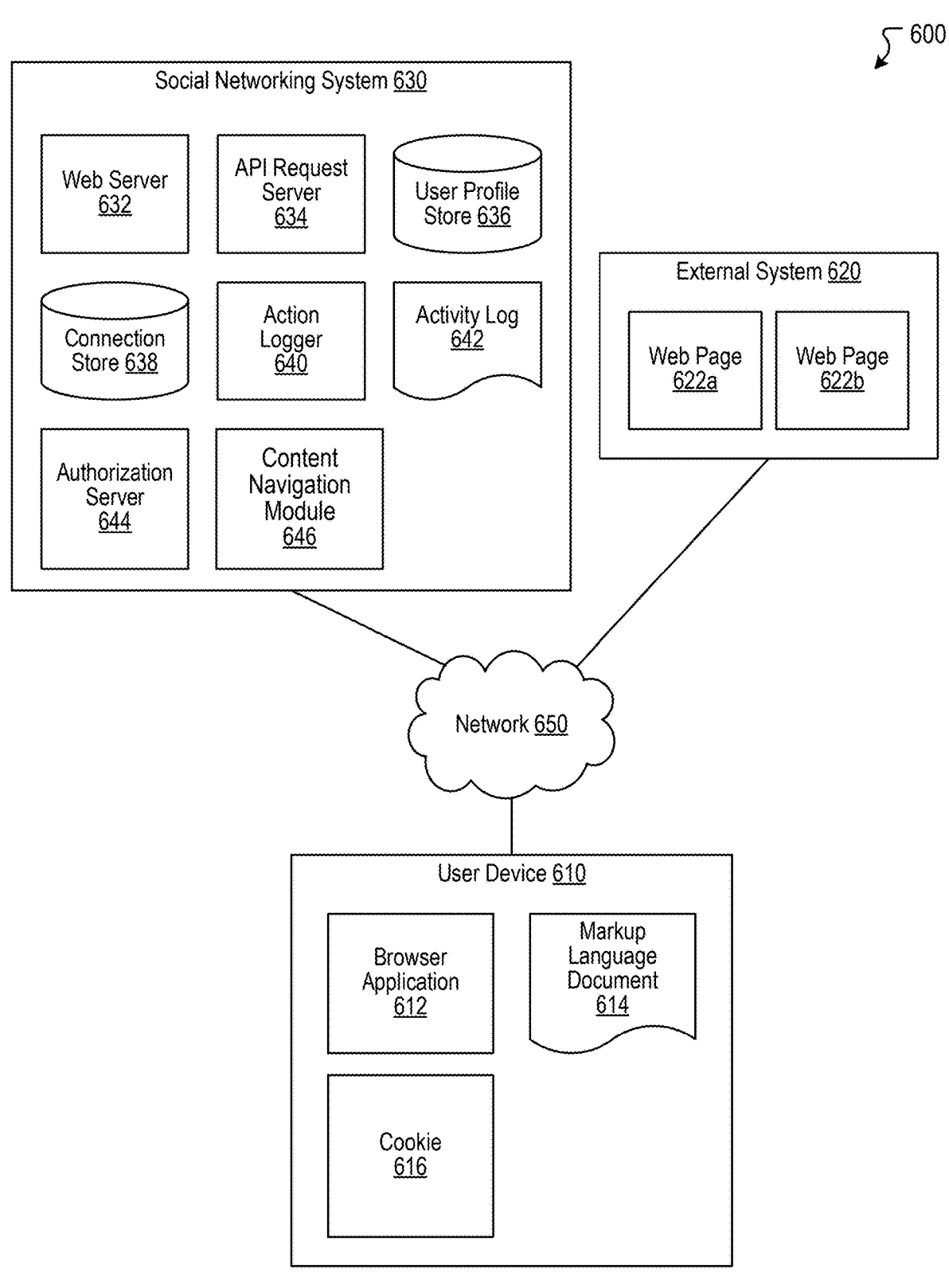
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, according to an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual", but connections may also be unilateral, or "one-way". For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content navigation module 646. The content navigation module 646 can be implemented with the content navigation module 102, as discussed in more detail herein. In various embodiments, some or all functionality of the content navigation module 102 can be additionally or alternatively implemented by the user device 610. It should be appreciated that there can be many variations or other possibilities.

Hardware Implementation

Figure 7:
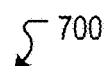
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, California, and the x86-compatible processors manufactured by Advanced Micro Devices (AMD), Inc., of Sunnyvale, California, as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs));

other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the present technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    providing, by a processor of a computing system, a currently playing content item in an interface presented through a screen to a group of users for collaborative online consumption;
    receiving, by the processor of the computing system, a first command in a selected direction from a first user in the group to determine a new content item for the group to consume;
    in response to the first command, determining, by the processor of the computing system, a plurality of new content items for the group to consume based on an interest of at least one user of the group, wherein the plurality of new content items comprises a first ordered collection of new content items determined based on a first interest associated with the first user and a second ordered collection of new content items determined based on a second interest associated with the group of users;
    selecting, by the processor of the computing system, the new content item from the plurality of new content items; and
    causing, by the processor of the computing system, scrolling of the interface such that the currently playing content item disappears and the new content item appears through the screen, wherein a second command by a second user of the group of users in a direction opposite to the selected direction causes at least partial appearance of a previously accessed content item.

2. The computer-implemented method of claim 1, wherein the first command is a swipe by the first user applied to the screen through which the interface is presented.

3. The computer-implemented method of claim 2, wherein the selected direction is vertical and upward.

4. The computer-implemented method of claim 2, wherein, during the swipe, the interface includes a notification that informs the group of users about the swipe.

5. The computer-implemented method of claim 4, wherein the notification includes an identification of the first user, who is performing the swipe.

6. The computer-implemented method of claim 4, wherein the notification includes an indication of the selected direction of the swipe.

7. The computer-implemented method of claim 4, wherein the notification disappears from the interface after conclusion of the swipe.

8. The computer-implemented method of claim 1, wherein at least partial appearance of a second new content item occurs in response to receipt of a second command in the selected direction by a second user of the group of users.

9. The computer-implemented method of claim 1, wherein the currently playing content item and the new content item are scrolled until the new content item is locked in full view and the currently playing content item is no longer viewable.

10. A system comprising:
    at least one processor; and
    a memory storing instructions that, when executed by the at least one processor, cause the system to perform operations comprising:
        providing a currently playing content item in an interface presented through a screen to a group of users for collaborative online consumption;
        receiving a command in a selected direction from a first user in the group to determine a new content item for the group to consume;
        in response to the command, determining a plurality of new content items for the group to consume based on an interest of at least one user of the group, wherein the plurality of new content items comprises a first ordered collection of new content items determined based on a first interest associated with the first user and a second ordered collection of new content items determined based on a second interest associated with the group of users;
        selecting the new content item from the plurality of new content items; and
        causing scrolling of the interface such that the currently playing content item disappears and the new content item appears through the screen, wherein a second command by a second user of the group of users in a direction opposite to the selected direction causes at least partial appearance of a previously accessed content item.

11. The system of claim 10, wherein the command is a swipe by the first user applied to the screen through which the interface is presented.

12. The system of claim 11, wherein the selected direction is vertical and upward.

13. The system of claim 11, wherein, during the swipe, the interface includes a notification that informs the group of users about the swipe.

14. The system of claim 13, wherein the notification includes an identification of the first user, who is performing the swipe.

15. A non-transitory computer-readable storage medium including instructions that, when executed by at least one processor of a computing system, cause the computing system to perform operations comprising:

providing a currently playing content item in an interface presented through a screen to a group of users for collaborative online consumption;

receiving a command in a selected direction from a first user in the group to determine a new content item for the group to consume;

in response to the command, determining a plurality of new content items for the group to consume based on an interest of at least one user of the group, wherein the plurality of new content items comprises a first ordered collection of new content items determined based on a first interest associated with the first user and a second ordered collection of new content items determined based on a second interest associated with the group of users;

selecting the new content item from the plurality of new content items; and causing scrolling of the interface such that the currently playing content item disappears and the new content item appears through the screen, wherein a second command by a second user of the group of users in a direction opposite to the selected direction causes at least partial appearance of a previously accessed content item.

16. The non-transitory computer-readable storage medium of claim 15, wherein the command is a swipe by the first user applied to the screen through which the interface is presented.

17. The non-transitory computer-readable storage medium of claim 16, wherein the selected direction is vertical and upward.

18. The non-transitory computer-readable storage medium of claim 16, wherein, during the swipe, the interface includes a notification that informs the group of users about the swipe.

19. The non-transitory computer-readable storage medium of claim 18, wherein the notification includes an identification of the first user, who is performing the swipe.

* * * * *